US006889270B2

(12) United States Patent
Gregg et al.

(10) Patent No.: US 6,889,270 B2
(45) Date of Patent: May 3, 2005

(54) EFFICIENT READING OF A REMOTE FIRST-IN FIRST-OUT BUFFER

(75) Inventors: Thomas A. Gregg, Highland, NY (US); Stephen R. Burrow, Austin, TX (US); Kulwant M. Pandey, Lagrangeville, NY (US); Patrick J. Sugrue, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/800,558

(22) Filed: Mar. 15, 2004

(65) Prior Publication Data

US 2004/0177178 A1 Sep. 9, 2004

Related U.S. Application Data

(62) Division of application No. 09/961,011, filed on Sep. 21, 2001, now Pat. No. 6,775,723.

(51) Int. Cl.[7] .............................. G06F 3/12; G06F 3/24

(52) U.S. Cl. ............................. 710/57; 710/19; 710/263
(58) Field of Search .............................. 710/15, 19, 52, 710/57, 260, 263, 266

(56) References Cited

U.S. PATENT DOCUMENTS

| 5,708,814 A | * | 1/1998 | Short et al. ................... 710/260 |
| 5,966,547 A | * | 10/1999 | Hagan et al. .................. 710/57 |
| 6,269,412 B1 | * | 7/2001 | Liu et al. ...................... 710/19 |
| 2003/0034797 A1 | * | 2/2003 | Bentz ............................ 326/38 |

* cited by examiner

Primary Examiner—Kim Huynh
(74) Attorney, Agent, or Firm—Lynn L. Augspurger

(57) ABSTRACT

A method and system for a processor to efficiently accesses a remote First-in First-out (FIFO) buffer that is used to record event information. The access involves an interrupt mechanism when the FIFO transitions from the empty state, a mechanism for reading a FIFO entry including FIFO state information, and a mechanism for reading large areas of the FIFO while maintaining the pointers and interrupt protocols.

5 Claims, 4 Drawing Sheets

EFFICIENT READING OF A REMOTE FIRST-IN FIRST-OUT BUFFER

This application is a divisional of U.S. patent application Ser. No. 09/961,011 filed on Sep. 21, 2001, now U.S. Pat. No. 6,775,723 entitled "Efficient Reading of a Remote First In First Out Buffer", the entirety of which is hereby incorporated herein by reference

FIELD OF THE INVENTION

The present invention relates generally to buffering events in a computer system in a memory and accessing this memory in way that provides the maximum mount of information with the fewest accesses.

BACKGROUND

In a computer system, various events are detected by the hardware and must be subsequently handled by a processor. These events include signals received on inbound Input/Output (I/O) interfaces, power and cooling systems alerts, error conditions, and failure conditions. Sometimes these events can happen faster than they can be handled in real time by the processor. To overcome this, a small memory element is typically added to the system to temporarily store the events until they can be handled by the processor. The memory element is often structured as a first-in, first-out (FIFO) buffer in a communication system.

When the processor is physically and logically located at a distance from the FIFO, each access that the processor makes to read the FIFO takes a considerable amount of time. As processors get faster, the number of processor cycles consumed waiting for the returned FIFO data increases. As this problem has been recognized, other related problems have been experience during development. When the FIFO fills with many events, the processor must access the FIFO for each event in the FIFO. Each time an event is put into the FIFO, the system causes an interrupt to the processor. These events cause considerable overhead to the processor since the processor typically makes a context switch to software used to handle the interrupt.

SUMMARY OF THE INVENTION

It has been recognized that it would be desireable to present the maximum information to a processor each time it reads the FIFO buffer in a communication system. This invention presents different information depending on the state of the FIFO (its fullness), and the state of the system. The preferred embodiment for a computer system having a communication link processor and employing a FIFO buffer and controling an asynchronous event storing and recording mechanism to write discreet events into the FIFO at a location determined by a write pointer; and then reading with the attached communication link processor reading the recording mechanism's FIFO at a location determined by a read pointer. Then the recording mechanism conditionally returns event and status information and conditionally increments the FIFO read pointer.

In accourdance with the preferred embodiment a fullness indication of the FIFO is returned in the read information as the value of the FIFO read pointer and write pointer. Furthermore, the recording mechanism returns system status when the FIFO is completely empty; and an event description when the FIFO has one or more valid entries.

The preferred embodiment of the invention has a mode where the processor can read multiple entries of the FIFO using a single command. Once again, the format of the returned data is different from the variable information returned by a single FIFO access.

It is another object of the present invention to reduce the number of interrupts presented to the processor by sharing information as to the fullness of the FIFO as observed by the processor and known to the FIFO.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
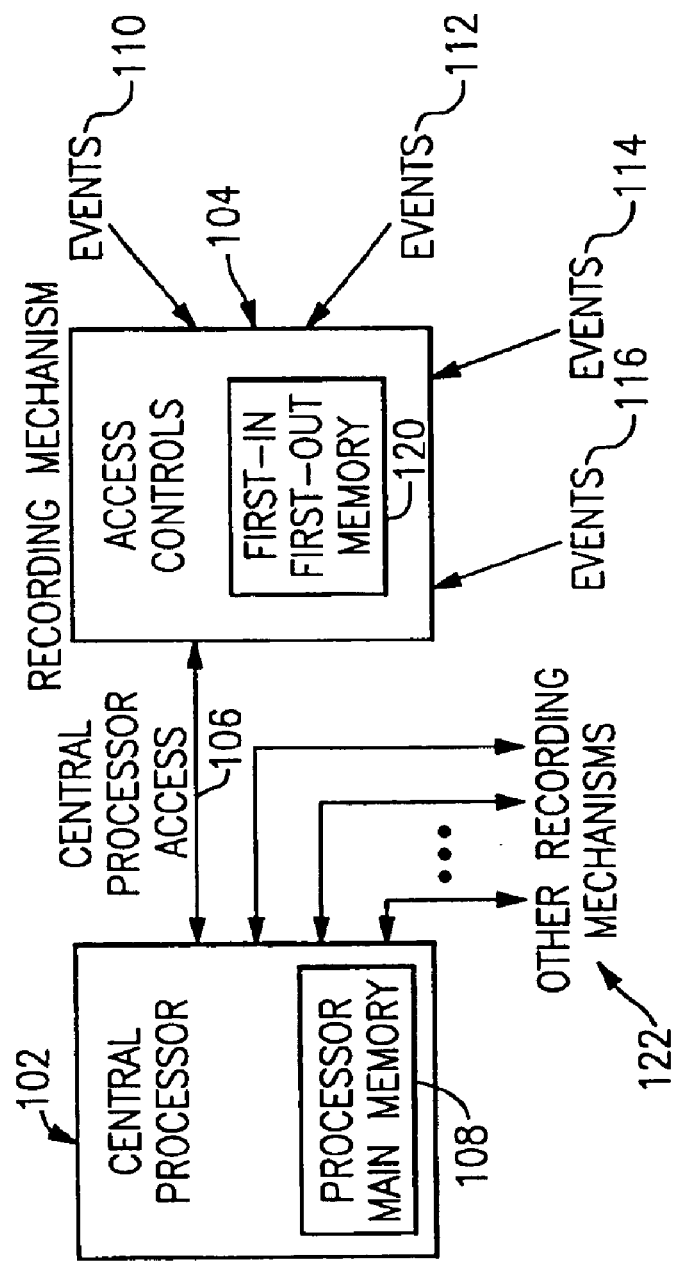
FIG. 1 illustrates a system containing a processor and an event FIFO including its controls.

FIG. 1 shows the relationship of a central processor 102 to an event recording mechanism 104 that captures various events 110, 112, 114, 116 from various sources within a computer system. While the current invention relates specifically to events received from an Input/Output interface, this invention could just as well be used in any apparatus used to record events from a wide variety of sources. For example, the recording mechanism could be applied to a system used to monitor many different kinds of events such as system errors, temperature alerts, etc. The processor 102 comprises a main memory 108. Within the recording mechanism is a circular FIFO 120 and control logic. The connection between the processor 102 and the recording mechanism 104 is a computer bus 106 comprising several functions:

1) The ability for the processor to load information from the recording mechanism into one of the processor's general registers,
2) The ability of the processor to store information into the recording mechanism from one of the processor's general registers,
3) The ability of the recording mechanism to store blocks of data into the processor's main memory, and
4) The ability of the recording mechanism to send interruption signals to the processor.

Typically, the processor handles multiple recording mechanisms 122 within a system.

Figure 2:
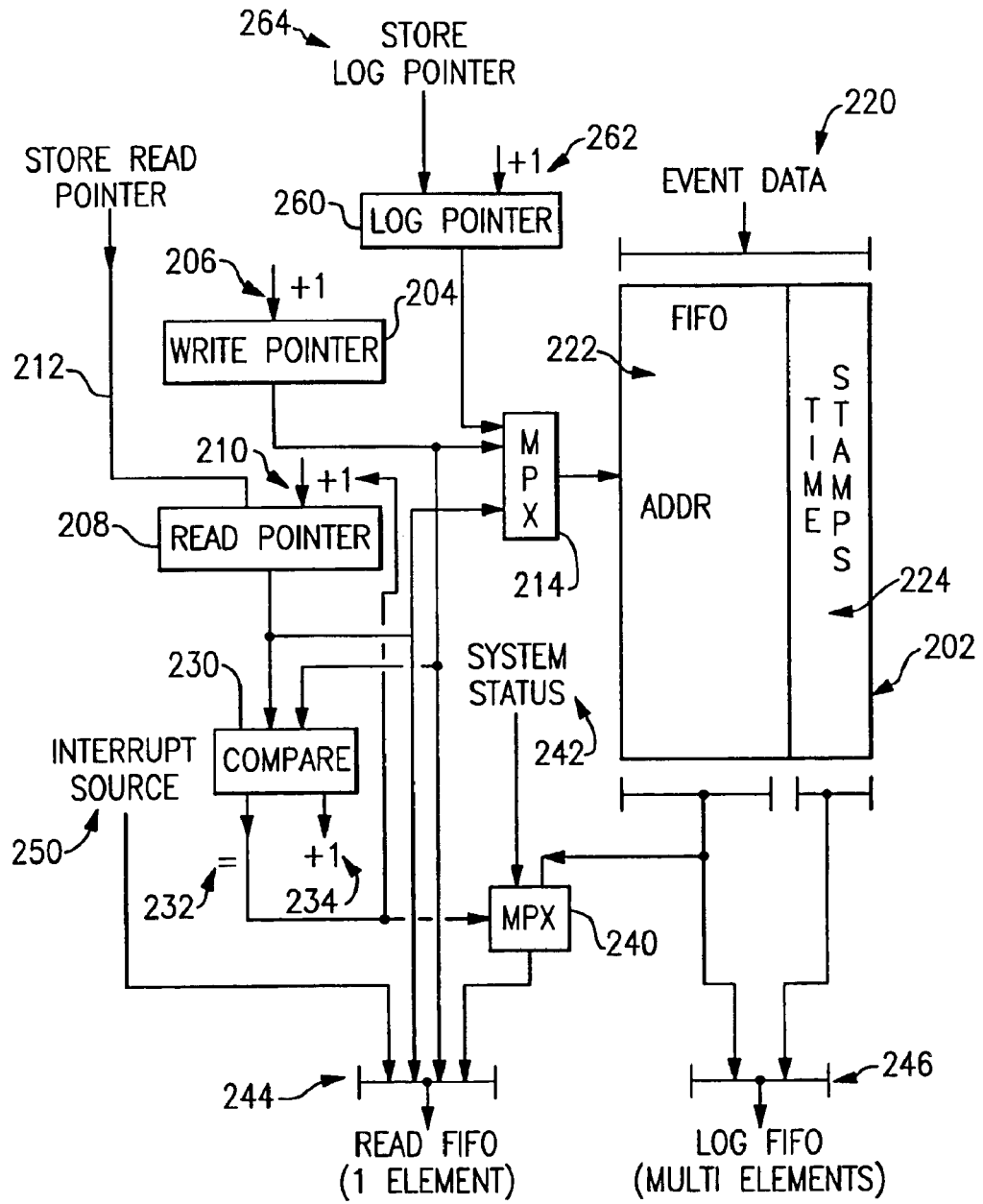
FIG. 2 illustrates the internal controls of the event FIFO.

FIG. 2 shows the internals of the recording mechanism 102 of FIG. 1. FIFO buffer 202 is implemented as a linearly addressable array and has space for 256 entries; each entry is 8 bytes. A different size buffer could be used, and the pointer sizes could be adjusted accordingly. The write pointer 204 is controlled by the recording mechanism and points to the next entry in the FIFO to be written when the next event occurs. After writing an event, the control logic increments the write pointer by 1 206. The read pointer 208 is directly and indirectly controlled by the processor and points to the next entry in the FIFO that the processor will read. After the processor reads the FIFO using a load instruction, the controls automatically increment the read pointer by 1 210 only if the write pointer 204 value is not equal to the read pointer 208. If the two pointer values are equal, the FIFO is completely empty (as described below), and no change is made to the read pointer 208. The processor also has the capability of setting the read pointer to any value over path 212 using a store instruction. Each pointer 204, 208 is 8 bits, and when the pointers have equal values, the FIFO is defined to completely empty rather than completely full. As a consequence, the FIFO never has more than 256−1 (255) valid entries, and the recording mechanism control hardware ensures that the FIFO will never have more than 255 valid entries. A FIFO overrun condition is detected if more events occur than there is space for in the FIFO. When entries are written into the FIFO, write pointer 204 is gated through the multiplexor (MPX) 214 to the FIFO 202. When entries are read by the processor, read pointer 208 is gated through multiplexor 214 to the FIFO 202.

The event data 220 includes a description of the event 222 and a time stamp 224 used primarily as a debug tool. Compare circuit 230 compares the write pointer 204 to the read pointer 208. When the two pointers have the same value 232, the FIFO is completely empty. When the pointers differ by exactly one, that is, the write pointer is ahead of the read pointer by exactly 1, or the read pointer+1 equals the write pointer, there is exactly one valid entry 234 in the FIFO. This information 234 is part of the interrupt presentation to the processor and is described below. When the FIFO is completely empty, mupliplexor (MPX) 240 gates the system status 242 back to the processor when the processor reads the FIFO. When the FIFO is not completely empty, the multiplexor 240 gates the event description from the FIFO entry back to the processor. In either case when the FIFO is either completely empty or not completely empty, the value of the write pointer 204, read pointer 208, and interrupt source information 250 is always returned to the processor. The interrupt source information tells the software of any other sources of the interrupt other than FIFO entries. All of this information is read over data path 244 when the processor reads a FIFO entry using its load instructions. The log pointer 260 is loaded from the processor over path 264 when the processor wants the recording mechanism to automatically store one of more FIFO entries directly into the processor's main memory. In this case, data path 246 is used by the recording mechanism, and this path includes different information from data path 244, as described below.

Figure 3:
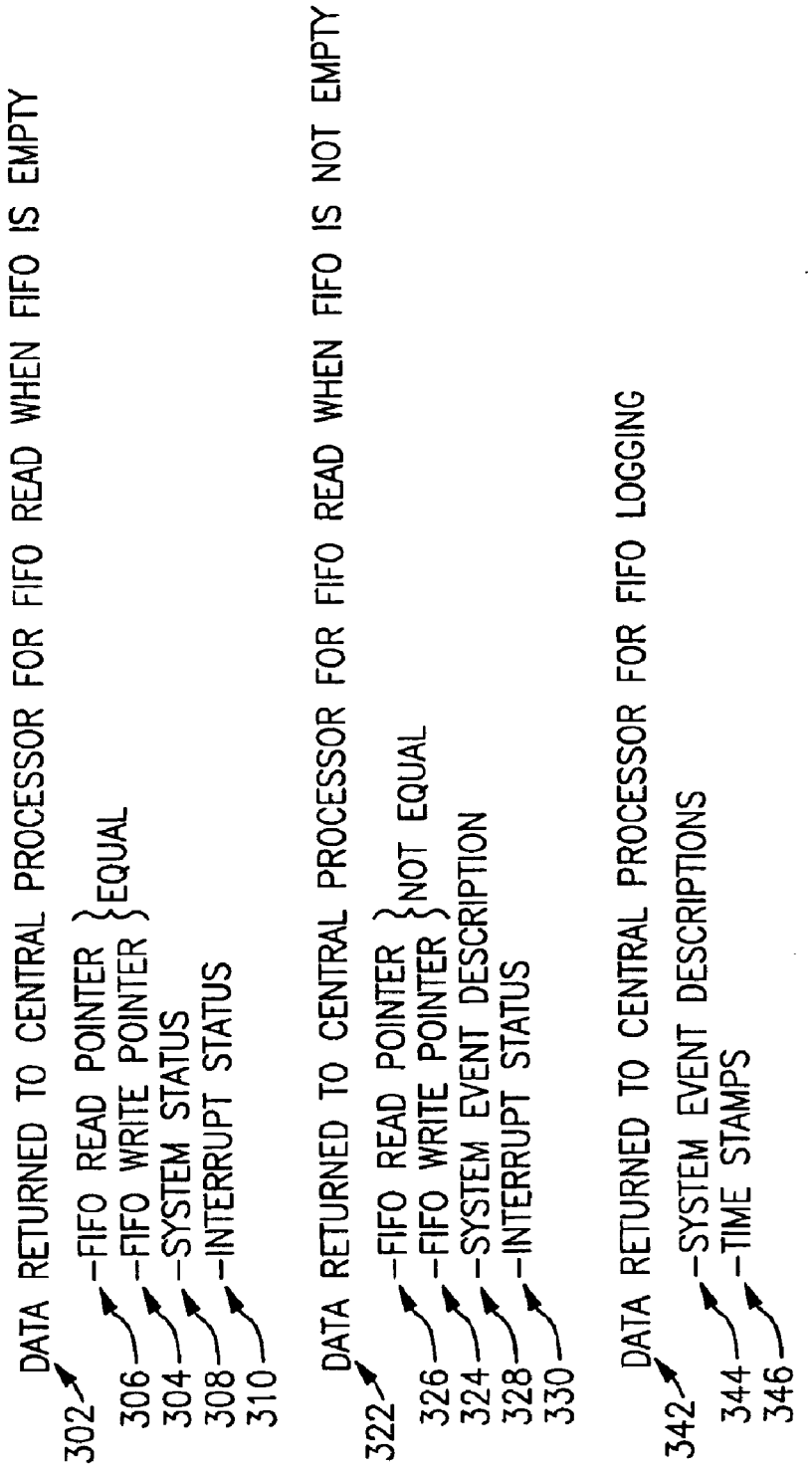
FIG. 3 illustrates the data returned from the FIFO in different states and by different data paths.

FIG. 3 shows the formats of the data generated by the recording mechanism. The data returned to the processor when it reads a FIFO entry and the FIFO is completely empty 302 includes the value of the write pointer 304, the read pointer 306, the system status 308, and interruption source information 310. When the processor software receives this information, it first examines the write pointer 304 and the read pointer 306. In this case, these pointers are equal, so the software knows that the rest of the data includes the system status 308 and interrupt source information 310. If the processor reads the FIFO as a result of an interrupt, it is likely that the interrupt source information indicates some interrupt other than a FIFO event. The data returned to the processor when it reads a FIFO entry and the FIFO is not completely empty 322 includes the value of the write pointer 324, the read pointer 326, the description of the system event 328 (the FIFO entry), and interruption source information 330. When the processor software receives this information, it first examines the write pointer 304 and the read pointer 306. In this case, these pointers are not equal, so the software knows that the rest of the data includes a description of the event 328 (the FIFO entry) and interrupt source information 330. If the processor reads the FIFO as a result of an interrupt, in this case it is likely that the FIFO has an event for the software, but the interrupt source information may indicate some additional interrupt source other than a FIFO event.

FIG. 3 also shows the format of the data used when the recording mechanism is instructed to store a block of FIFO data into the processor's main memory. Each 8 bytes 342 includes the FIFO event descriptions 344, but instead of current status conditions (including write pointer and read pointer values, system status, and interrupt source information), a time stamp 346 from the FIFO entry is included. The processor retrieves multiple entries from the FIFO when it wants to log activity for problem determination or read many entries because there are too many to be efficiently read using individual load instructions.

When the processor wants to read multiple entries from the recording mechanism, it first loads the log pointer 260 to the starting location in the FIFO where it wants the recording mechanism to start reading entries. The processor then sends a command to the recording mechanism telling it how many entries to store into the processor's main memory and the starting address in the processor's main memory. The main memory address is on an 8 byte boundary. The recording mechanism starts reading the FIFO entries at the current log pointer address and if it reaches the end of the FIFO array before the entry count of the command is exhausted, it wraps back to the beginning of the FIFO array. In this way, the contents in main memory always progresses from the oldest entry in the FIFO to the newest entry in the FIFO. After the recording mechanism finishes storing the data into the processor's main memory, it sets an indicator in the system status that can be examined by the processor. Also, the recording mechanism can be instructed in the log command to send an interrupt to the processor. After the processor determines that the recording mechanism has finished storing the data into its main memory, it can advance the read pointer to 'skip over' the entries that the recording mechanism stored.

Figure 4:
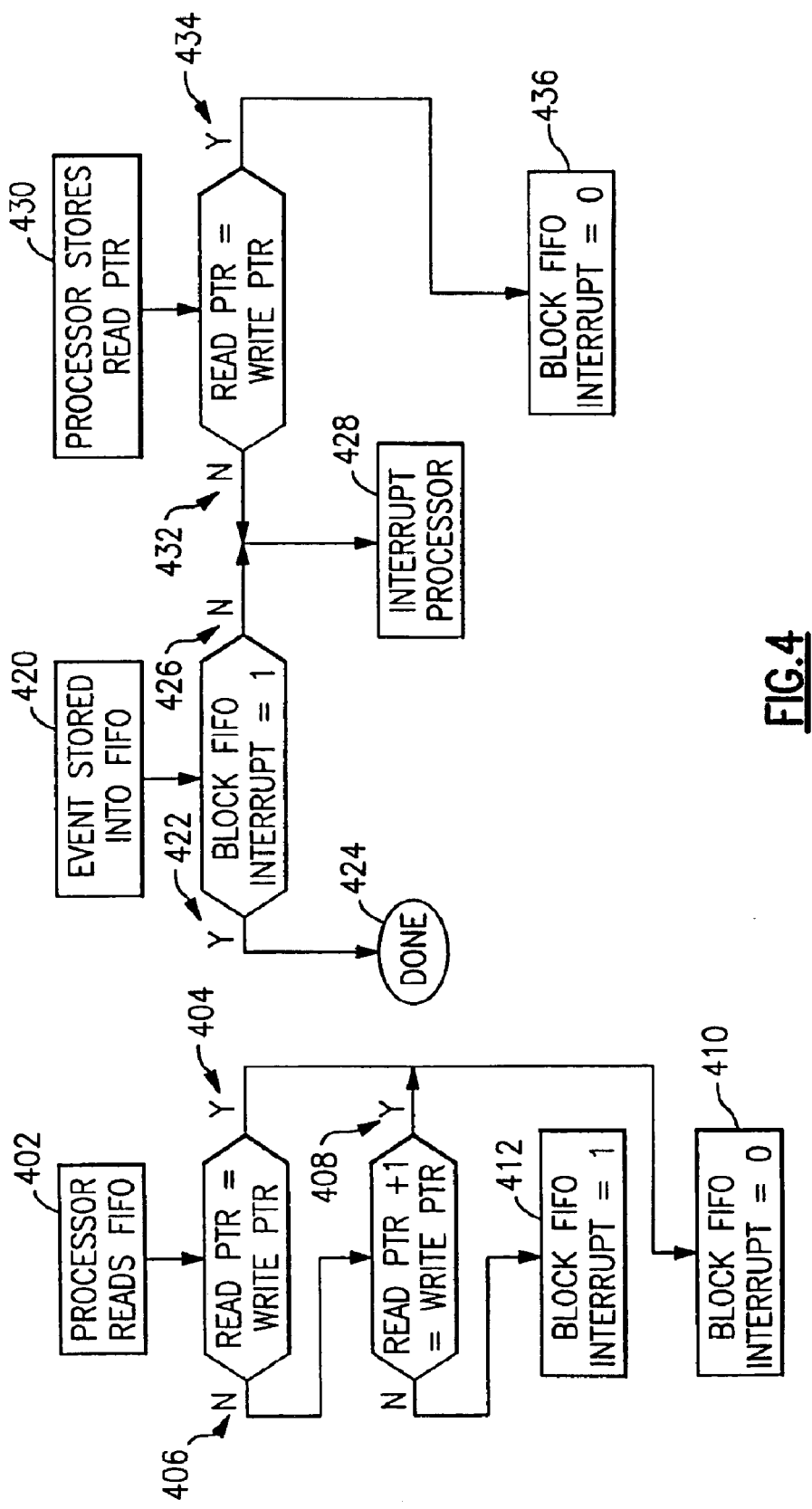
FIG. 4 illustrates a flowchart of the actions taken to control the interrupts to the processor.

FIG. 4 is a flowchart of how interruptions to the processor are generated by the recording mechanism. Typically in the previous art, each time an event is stored into the FIFO, an interrupt is generated to the processor. Interrupts require a lot of processor overhead, so the recording mechanism only sends interrupts when the processor wants them. For the recording mechanism to detect when the processor wants to receive an interrupt, it uses a latch called the Block FIFO Interrupt latch. Each time the processor reads the FIFO using its load instruction 402, the recording mechanism compares the value of the write pointer and read pointer returned in the data to the processor. Since the values examined by the recording mechanism are the same as those returned to the processor, the recording mechanism knows that the processor will make the same decisions and is in synchronism with the recording mechanism. If the values of the write pointer and read pointer are the same 404, the FIFO is completely empty and the processor will want an interrupt when the next FIFO entry is made. Otherwise 406, if the value of the write pointer is ahead of the read pointer by exactly one 408, there is exactly one entry in the FIFO, and this entry is being returned to the processor by this reading of the FIFO. After the read operation, the read pointer is incremented by one, as explained in the description of FIG. 2, and the write pointer is equal to the read pointer. As a result, if the write pointer and read pointer indicate that the FIFO is either completely empty of has exactly one entry, both the recording mechanism and the software agree that an interrupt will be generated when the next FIFO entry is made. Returning to FIG. 4, the Block FIFO Interrupt latch is reset 410 allowing the next FIFO event to cause an interrupt if the last FIFO read indicated that the FIFO was either completely empty or had exactly one entry; and the Block FIFO Interrupt latch is set 412 when the FIFO has more than one entry. When the FIFO has more than one valid entry, the recording mechanism knows that the software will continue to read FIFO entries until there is either exactly one valid entry or until the FIFO is completely empty. In this case, subsequent FIFO entries do not require an interrupt to be sent to the processor.

FIG. 4 also shows what happens when the recording mechanism makes a FIFO entry 420. After the entry is made, the recording mechanism checks the state of the Block FIFO Interrupt latch to see it if should send an interrupt to the processor. If the Block FIFO Interrupt latch is set 422, no interrupt is generated and the recording mechanism is finished 424. If the Block FIFO Interrupt latch is not set 426, in interrupt is sent 428 to the processor.

The flowchart in FIG. 4 also shows what happens when the processor stores into the read pointer using a store instruction 430. If the write pointer is not equal to the read pointer 432, the FIFO has at least one entry, so the recording mechanism sends an interrupt to the processor 428 to inform it of this condition. If the Write pointer is equal to the read pointer 434, the FIFO is empty and the recording mechanism resets the Block FIFO Interrupt latch 436 to allow the next FIFO entry to send an interrupt to the processor.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for controllng a computer system having a communication link processor and employing recording mechanisms with a FIFO for buffered event entries, comprising the steps of:

controlling descreet events for an asynchronous event recording mechanism by storing discreet events into the FIFO at a location determined by an event write pointer; and causing an attached processor to read the recording mechanism's FIFO at a location determined by an event read pointer;

said recording mechanism returning event and status information; and incrementing the FIFO read pointer; and causing said recording mechanism to store one or more of multiple event entries into main memory of said processor, wherein the said multiple storing of entries from the FIFO does not affect the state of the FIFO event read pointer or event write pointer.

2. The method as recited in claim 1, wherein a fullness indication of the FIFO is returned in read information to said processor as the value of the FIFO event read pointer and event write pointer.

3. The method as recited in claim 1, wherein the recording mechanism returns:

system status when the FIFO is completely empty; and an event description when the FIFO has one or more valid entries.

4. The method as recited in claim 1, wherein the processor can instruct the recording mechanism to store multiple entries into the processor's main memory from any of said recording mechanisms.

5. The method as recited in claim 4, wherein the said multiple storing of entries from the FIFO does not affect the state of the FIFO read pointer or write pointer in any of the recording mechanisms employed.

* * * * *